(12) United States Patent
Schillinger

(10) Patent No.: US 12,186,915 B2
(45) Date of Patent: Jan. 7, 2025

(54) DEVICE AND METHOD FOR CONTROLLING ONE OR MORE ROBOTS

(71) Applicant: Robert Bosch GmbH, Stuttgart (DE)

(72) Inventor: Philipp Christian Schillinger, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 612 days.

(21) Appl. No.: 17/448,406

(22) Filed: Sep. 22, 2021

(65) Prior Publication Data
US 2022/0105637 A1 Apr. 7, 2022

(30) Foreign Application Priority Data

Oct. 7, 2020 (DE) ...................... 10 2020 212 659.3
Mar. 1, 2021 (DE) ...................... 10 2021 201 918.8

(51) Int. Cl.
*B25J 9/16* (2006.01)
*B25J 9/00* (2006.01)
*G06N 7/01* (2023.01)

(52) U.S. Cl.
CPC ........... *B25J 9/1682* (2013.01); *B25J 9/0084* (2013.01); *G06N 7/01* (2023.01)

(58) Field of Classification Search
CPC ......... B25J 9/1682; B25J 9/0084; G06N 7/01; G06N 20/00; G05B 2219/39101; G05B 2219/39252
See application file for complete search history.

(56) References Cited

U.S. PATENT DOCUMENTS 9,336,456 B2 * 5/2016 DeLean .................. G06V 40/20
2015/0278579 A1 * 10/2015 Saklatvala ............. G06V 10/75
382/203

(Continued)

OTHER PUBLICATIONS

Schillinger, P. et al. "Hierarchical LTL-Task MDPs for Multi-Agent Coordination through Auctioning and Learning" The International Journal of Robotice Research, 2019, Retrieved from the Internet on Sep. 22, 2021: https://www.diva-portal.org/smash/get/diva2:1296473/FULLTEXT01.pdf. 23 Pages.

(Continued)

*Primary Examiner* — Adam R Mott
*Assistant Examiner* — Sagar Kc
(74) *Attorney, Agent, or Firm* — NORTON ROSE FULBRIGHT US LLP; Gerard A. Messina

(57) ABSTRACT

A device and a method for controlling one or more robots. The method includes: for each robot of the one or more robots, determining a labeled Markov decision process for each skill of one or more skills which the robot is able to implement, each labeled Markov decision process having a labeling function which indicates for each state of the labeled Markov decision process, whether one or more control conditions of a plurality of predetermined control conditions is/are satisfied; providing a control mission defined by a mission specification, the mission specification having a time sequence over a subset of the plurality of predetermined control conditions; and controlling the one or more robots to execute the control mission in such a way that the control conditions of states of the one or more robots contained in the mission specification are satisfied.

13 Claims, 3 Drawing Sheets

(56) References Cited

U.S. PATENT DOCUMENTS

| | | | | |
|---|---|---|---|---|
| 2015/0278735 | A1* | 10/2015 | Mizuta | G06N 5/047 |
| | | | | 705/7.23 |
| 2016/0136807 | A1* | 5/2016 | Scheurer | B25J 9/1612 |
| | | | | 700/250 |
| 2018/0281191 | A1* | 10/2018 | Sinyavskiy | G05D 1/0214 |
| 2018/0293517 | A1* | 10/2018 | Browne | H04L 67/01 |
| 2020/0111005 | A1* | 4/2020 | Ghosh | G06N 3/042 |
| 2020/0282549 | A1* | 9/2020 | Torii | B25J 9/1661 |
| 2020/0372410 | A1* | 11/2020 | Karaletsos | G06N 20/00 |
| 2021/0019534 | A1* | 1/2021 | Sakamoto | G01S 17/86 |
| 2021/0034865 | A1* | 2/2021 | Nord | G06V 10/809 |
| 2022/0036179 | A1* | 2/2022 | Garg | G06N 3/08 |
| 2022/0044045 | A1* | 2/2022 | Grancharov | G06V 10/25 |

OTHER PUBLICATIONS

W. Ren and D. V. Dimarogonas, "Dynamic Quantization based Symbolic Abstractions for Nonlinear Control Systems" in Dimarogonas, in IEEE 58th Conference on Decision and Control (CDC), 2019. Retrieved from the Internet on Sep. 22, 2021: https://arxiv.org/pdf/2011.12816.pdf. 6 Pages.

* cited by examiner

DEVICE AND METHOD FOR CONTROLLING ONE OR MORE ROBOTS

FIELD

Various exemplary embodiments relate generally to a device and a method for controlling one or more robots.

BACKGROUND INFORMATION

One or more robots may be coordinated to handle a mission. For example, a team of robots may be coordinated to handle a mission together. In this case, auction methods may be used, for instance.

The reference "Hierarchical LTL-Task MDPs for Multi-Agent Coordination through Auctioning and Learning" by P. Schillinger et al., 2019, (hereinafter referred to as reference [1]) describes a method for coordinating a team of robots to jointly manage a mission defined with the aid of a Linear Temporal Logic (LTL), uncertainties being taken into account in doing so.

The reference "Dynamic Quantization based Symbolic Abstractions for Nonlinear Control Systems" by W. Ren and D. V. Dimarogonas, in IEEE 58th Conference on Decision and Control (CDC), 2019, (hereinafter referred to as reference [2]) describes an abstraction-based control logic for controlling a nonlinear system.

However, the robots in a team of robots may be from different manufacturers, and thus are programmed individually. Therefore, it may be necessary to provide a framework which makes it possible to coordinate the team of heterogeneous robots.

SUMMARY

In a team of robots, the robots may have different skills from one another. For example, some of the robots may be able to perceive the environment, some of the robots may be able to move within an operating area in order to navigate from one position to another position, some of the robots may be able to manipulate objects such as a robot arm, for instance, and some robots may be able to implement several of these skills.

The method and the device having the features in accordance with example embodiments of the present invention may make it possible to control one or more robots in order to execute a mission, taking into account the skills of one specific robot of the one or more robots. For example, the method and the device make it possible to control a team of robots in order to execute a mission together. In particular, the method and the device make it possible to control a team of heterogeneous robots having different skills in such a way that they are able to execute a mission collectively as a function of their respective skills.

A robot (in some aspects also referred to as robot device) may be any type of computer-controlled device such as a robot for manufacturing tasks, a maintenance robot, a domestic robot, a medical robot, a vehicle (e.g., an autonomous vehicle), a household appliance, a manufacturing machine, a personal assistant, an access-control system, etc.

The determination of a labeled Markov decision process for each skill of each robot of the one or more robots with a skill-specific labeling function for the ascertainment of control conditions (e.g., atomic propositions) according to a first example has the effect that the control conditions are used as abstraction (e.g., generalization) by which a mission given by control conditions may be executed by the one or more robots. For example, the mission given by control conditions may be executed by a variety of robots together (e.g., cooperatively).

At least one skill of the one or more skills of at least one robot of the one or more robots may be a perception skill. Determining the labeled Markov decision process for the perception skill of a robot may include: Determining a state space having a plurality of states, each state of the plurality of states having one specific probability of one or more perceptions and/or one specific position of one or more objects;

determining each action of an action space of the labeled Markov decision process, each action being assigned to a determination of the specific probability of at least one perception of the one or more perceptions and/or to a determination of the position of at least one object of the one or more objects; and determining the labeling function of the labeled Markov decision process, the labeling function indicating for one state, whether: one or more control conditions, which in each case are assigned to at least one perception of the one or more perceptions, is/are satisfied, each at least one perception being assigned a probability threshold value, and the respective control condition being satisfied if a probability of the at least one perception is greater than the assigned probability threshold value; whether one or more control conditions, which in each case are assigned to at least one object of the one or more objects, is/are satisfied, the respective control condition being satisfied if the robot recognizes that the position of the at least one object is within a predefined distance from an assigned reference point; and/or whether one or more common control conditions, which in each case are assigned to at least one perception of the one or more perceptions and at least one object of the one or more objects, is/are satisfied, the respective common control condition being satisfied if the probability of the at least one perception is greater than the assigned probability threshold value and if the robot recognizes that the position of the at least one object is within the predefined distance from the reference point. The features described in this paragraph in combination with the first example form a second example.

One perception of the one or more perceptions may be an object detection, and the probability of the perception may be the probability of the detection of the object. The features described in this paragraph in combination with the second example form a third example.

One perception of the one or more perceptions may be detection of a human body pose, and the probability of the perception may be the probability of the detection of the body pose. The features described in this paragraph in combination with the second example or the third example form a fourth example.

One perception of the one or more perceptions may be detection of a gesture, and the probability of the perception may have a specific probability of the detection of a gesture for each of one or more gestures. The features described in this paragraph in combination with one or more of the second example to the fourth example form a fifth example.

At least one skill of the one or more skills of at least one robot of the one or more robots may be a navigation skill. The determination of the labeled Markov decision process for the navigation skill of a robot may include: Determining a state space having a plurality of states, each state of the plurality of states having one specific position and orientation of the robot; determining each action of an action space of the labeled Markov decision process, each action featuring a change of the position and/or a change of the orientation of the robot; and determining the labeling function of the labeled Markov decision process, the labeling function indicating for one state whether one or more control conditions, which in each case are assigned to one spatial area, is/are satisfied, the respective control condition being satisfied if the position of the robot is within the spatial area. The features described in this paragraph in combination with one or more of the first example to the fifth example form a sixth example.

Each state of the plurality of states may have one specific position and orientation of the robot within a navigation area attainable by the robot with the aid of the navigation skill. The features described in this paragraph in combination with the sixth example form a seventh example.

At least one skill of the one or more skills of at least one robot of the one or more robots may be a manipulation skill. With the aid of the manipulation skill, a robot is able to manipulate a predefined manipulation space utilizing one or more manipulation capabilities. The determination of the labeled Markov decision process for the manipulation skill of a robot may include: Dividing the predefined manipulation space into a plurality of manipulation areas; determining a state space having a plurality of states, each state of the plurality of states being assigned to one manipulation area of the plurality of manipulation areas; determining each action of an action space of the labeled Markov decision process, each action being assigned to at least one manipulation capability; and determining the labeling function of the labeled Markov decision process, the labeling function indicating for one state whether one or more control conditions, that are assigned to one configuration of the robot, is/are satisfied. The features described in this paragraph in combination with one or more of the first example to the seventh example form an eighth example.

Each configuration of the robot may have one or more configuration positions. Each control condition of the one or more control conditions may be assigned to one specific configuration position of the one or more configuration positions. Each configuration position of the one or more configuration positions may be assigned one or more manipulation areas of the plurality of manipulation areas. The control condition assigned to one specific configuration position is able to be satisfied if the manipulation area assigned to the state corresponds to one of the one or more manipulation areas of the configuration position. The features described in this paragraph in combination with the eighth example form a ninth example.

Each configuration of the robot may have one specific end-effector configuration of a plurality of end-effector configurations. Each control condition of the one or more control conditions may be assigned to one end-effector configuration of the plurality of end-effector configurations. The control condition assigned to one specific end-effector configuration is able to be satisfied if the configuration of the robot has the end-effector configuration. The features described in this paragraph in combination with the eighth example or the ninth example form a tenth example.

The plurality of end-effector configurations may have a gripper configuration and/or a loosen configuration. The features described in this paragraph in combination with the tenth example form an eleventh example.

Each control condition of the plurality of predetermined control conditions for which the labeling function does not indicate for a state whether the control condition is satisfied, is not satisfied. The features described in this paragraph in combination with one or more of the first example to the eleventh example form a twelfth example.

A robot system may have one or more robots. The robot system may be set up to carry out the method according to one or more of the first example to the twelfth example. The robot system having the features described in this paragraph forms a thirteenth example.

A computer-program product is able to store program instructions which, if they are executed, carry out the method according to one or more of the first example to the twelfth example. The computer-program product having the features described in this paragraph forms a fifteenth example.

A non-volatile storage medium is able to store program instructions which, if they are executed, carry out the method according to one or more of the first example to the twelfth example. The non-volatile storage medium having the features described in this paragraph forms a sixteenth example.

A non-volatile storage medium is able to store program instructions which, if they are executed, carry out the method according to one or more of the first example to the twelfth example. The non-volatile storage medium having the features described in this paragraph forms a seventeenth example.

Exemplary embodiments of the present invention are represented in the figures and are explained in greater detail in the following description.

DETAILED DESCRIPTION OF EXAMPLE EMBODIMENTS

In a specific embodiment, a "computer" may be understood to be any type of logic-implementing entity, which may be hardware, software, firmware or a combination thereof. Therefore, a "computer" in a specific embodiment may be a hard-wired logic circuit or a programmable logic circuit such as a programmable processor, for example, a microprocessor (e.g., a CISC (processor with large instruction set) or a RISC (processor with reduced instruction set)). A "computer" may have one or more processors. A "computer" may also be software which is implemented or executed by a processor, for example, any type of computer program, e.g., a computer program which uses a virtual machine code such as Java. Any other type of implementation of the respective functions, which are described in greater detail in the following, may be understood as a "computer" in accordance with an alternative specific embodiment.

In a team of heterogeneous robots, the robots may be from different manufacturers and may have skills different from each other. In order for the team of heterogeneous robots to be able to execute a mission together, it is necessary to provide a conceptual framework which facilitates coordination of the team of heterogeneous robots. Various exemplary embodiments relate to a device and a method for controlling one or more robots, which are able to control the one or more robots as a function of their respective skills. Various exemplary embodiments relate to a device and a method for controlling one or more robots, which are able to control a team of heterogeneous robots in such a way that the robots are able to execute a mission together as a function of their respective skills.

Figure 1A:
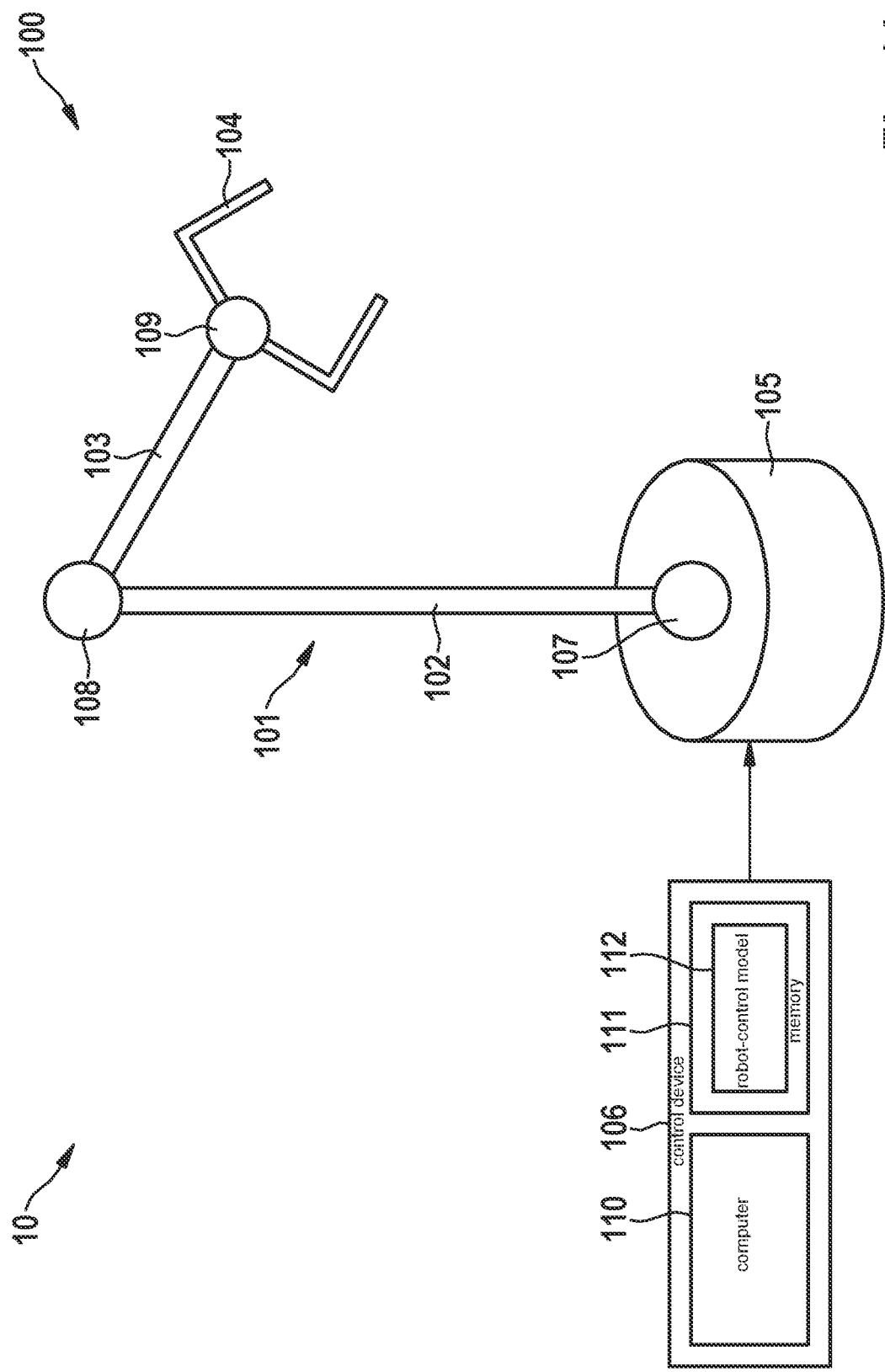
FIGS. 1A and 1B each shows an exemplary robot system according to various specific embodiments of the present invention.

FIG. 1A shows an exemplary robot system 10. Robot system 10 may have one or more robots such as a first robot 100, for instance.

For example, first robot 100 may feature an industrial robot in the form of a robot arm for moving, assembling or processing a workpiece. It should be pointed out that the following description of the first robot is used for illustration, and that a robot of the one or more robots of robot system 10 may be any type of robot.

First robot 100 may have a first robot device 101. First robot device 101 may have robot members 102, 103, 104 and a base (or generally a holder) 105, by which robot members 102, 103, 104 are supported. The term "robot member" relates to the movable parts of first robot device 101, whose actuation permits a physical interaction with the environment, for example, in order to perform a task, e.g., to implement or put into effect one or more skills.

For the control, first robot 100 includes a control device 106 which is equipped to realize the interaction with the environment according to a control program. Last element 104 (as viewed from base 105) of robot members 102, 103, 104 is also referred to as end effector 104 and may include one or more tools such as a welding torch, a gripping tool, a paint applicator or the like. According to various specific embodiments, control device 106 may be separated spatially from first robot device 101.

The other robot members 102, 103 (closer to base 105) may form a positioning device, so that together with end effector 104, a robot arm (or articulated arm) is provided having end effector 104 at its end. The robot arm is a mechanical arm which is able to fulfill functions similarly to a human arm (possibly with a tool at its end).

First robot device 101 may include joining elements 107, 108, 109, which join robot members 102, 103, 104 to each other and to base 105. A joining element 107, 108, 109 may have one or more joints, each of which is able to provide a rotational motion and/or a translatory movement (i.e., a shift) for associated robot members relative to each other. The movement of robot members 102, 103, 104 may be initiated with the aid of final controlling elements, which are controlled by control device 106.

The term "final controlling element" may be understood to be a component which, as a reaction to being driven, is capable of influencing a mechanism. The final controlling element is able to convert instructions (referred to as the activation) output by control device 106 into mechanical movements. For example, the final controlling element, e.g., an electromechanical transducer, may be equipped, as a reaction to being driven, to convert electrical energy into mechanical energy.

The term "control device" (also referred to as "controller") used here may be understood to be any type of logic implementation unit that may include a circuit and/or a processor, for example, which is capable of executing software, firmware or a combination thereof stored in a storage medium, and is able to impart the instructions, e.g., to a final controlling element in the present example. For instance, the control device may be equipped by program code (e.g., software) to control the operation of a system, in the present example, a robot or a plurality of robots.

In the present example, control device 106 includes a computer 110 and a memory 111 which stores code and data, based on which computer 110 controls first robot device 101. According to various specific embodiments, control device 106 controls robot device 101 on the basis of a robot-control model 112 stored in memory 111.

First robot 100 may be equipped to implement one or more skills. The skills may be predefined in the program code of control device 106, for example. According to various specific embodiments, first robot 100 may have a manipulation skill. For example, the manipulation skill may include one or more manipulation capabilities such as a mechanical movement of one or more robot members 102, 103, 104 and/or a capability of the end effector (e.g., gripping, e.g., loosening, e.g., placing, etc.).

Figure 1B:
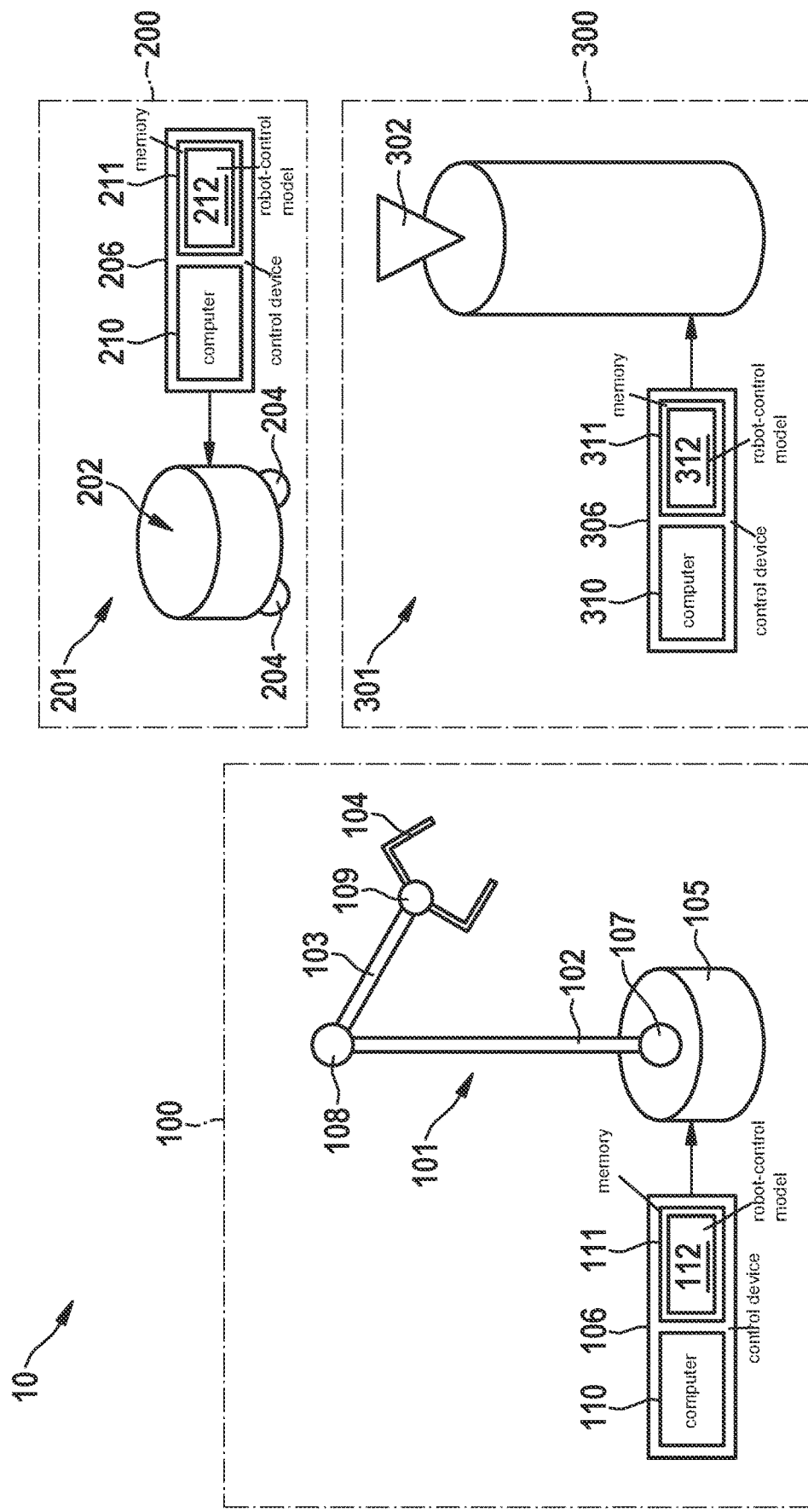

With reference to FIG. 1B, exemplary robot system 10 may have several robots, (e.g., a variety of robots). The robots of the variety of robots may be heterogeneous robots. For example, robot system 10 may be a multi-agent system having a plurality of robots. For illustration, robot system 10 shown in FIG. 1B and described by way of example in the following depicts exemplary first robot 100, an exemplary second robot 200 and an exemplary third robot 300.

According to various specific embodiments, robot system 10 may have at least two robots. The at least two robots may be heterogeneous robots. The phrase "heterogeneous robots" as used herein may include robots having skills differing from each other. Illustratively, at least one robot may have a skill which another robot does not have. The phrase "heterogeneous robots" as used herein may include robots from different manufacturers and/or having different control models.

It should be noted that every robot described herein may be any type of computer-controlled device, such as a robot for manufacturing tasks, a maintenance robot, a domestic robot, a medical robot, a vehicle (e.g., an autonomous vehicle), a household device, a manufacturing machine, a personal assistant, an access-control system, etc., and that the one or more robots may include any other type of robot.

For example, second robot 200 may feature a transport robot. For instance, second robot 200 may be equipped to implement one or more skills, where at least one skill may be a navigation skill. The navigation skill may feature a movement from one position to another position, for example. The navigation skill may include, e.g., navigation from one position to another position within an operating area of second robot 200. For instance, the navigation skill may feature navigation within the operating area of second robot 200, taking into account one or more obstacles, other robots, restricted areas, etc. According to various specific embodiments, second robot 200 may have one or more sensors which facilitate navigation within the operating area, such as a position sensor, a velocity sensor, an acceleration sensor, etc.

Second robot 200 may have a second robot device 201. Second robot device 201 may have a transport surface 202. According to various specific embodiments, one or more objects may be or are disposed on transport surface 202. Second robot device 201 may have one or more wheels 204 (e.g., rollers). According to various specific embodiments, robot device 201 is able to move from one position to another position with the aid of the one or more wheels 204. For example, objects may be placed on transport surface 202, and second robot 200 may be set up to transport the objects from one position to another position.

For the control, second robot 200 includes a control device 206 which is equipped to realize the interaction with the environment according to a control program. According to various specific embodiments, control device 206 may be separated spatially from second robot device 201. In the present example, control device 206 includes a computer 210 and a memory 211 which stores code and data, based on which computer 210 controls second robot device 201. According to various specific embodiments, control device 206 controls robot device 201 on the basis of a robot-control model 212 stored in memory 211. For instance, control device 206 may be set up to navigate second robot device 201 within the operating area.

For example, third robot 300 may feature a robot having a perception skill. For instance, third robot 300 may be equipped to implement one or more skills, where at least one skill may be a perception skill. The perception skill may be any type of perception of an environment of third robot 300 such as, e.g., detecting of objects, tracking of objects, determining a position of one specific object, detection of at least one hand (e.g., a hand of a user who is interacting or would like to interact with one robot or with several robots of the one or more robots like, for example, the variety of robots), tracking of at least one hand, determining a position of a hand, detecting a body pose (e.g., a human body pose of the user), detecting gestures (e.g., a gesture performed by the user), etc. According to various specific embodiments, gestures of a user may be interpreted by the robot as instructions.

Third robot 300 may have a third robot device 301. Third robot device 301 may have one or more sensors 302 for perceiving the environment of third robot 300. The one or more sensors 302 may be furnished to provide sensor data, by which the environment is or is able to be perceived (e.g., described). For instance, the one or more sensors 302 may include an imaging sensor such as a camera (e.g., a standard camera, a digital camera, an infrared camera, a stereo camera, etc.), a radar sensor, a LIDAR sensor, an ultrasonic sensor, etc.

For the control, third robot 300 includes a control device 306 which is equipped to realize the interaction with the environment according to a control program. According to various specific embodiments, control device 306 may be separated spatially from third robot device 301. In the present example, control device 306 includes a computer 310 and a memory 311 which stores code and data, based on which computer 310 controls third robot device 301. According to various specific embodiments, control device 306 controls robot device 301 on the basis of a robot-control model 312 stored in memory 311.

According to various specific embodiments, robot system 10 may have a central control device. The central control device may be equipped to perform one or more tasks of respective control devices 106, 206, 306.

Illustratively, robot system 10 may have one or more robots (e.g., first robot 100, second robot 200 and/or third robot 300), and each robot of the one or more robots may be equipped to implement one or more skills (e.g., a basic skill), such as a perception skill, a navigation skill and/or a manipulation skill. According to various specific embodiments, the one or more robots may be a variety of robots, and the robots of the variety of robots may be heterogeneous robots. According to various specific embodiments, at least two robots of the variety of robots may be equipped to implement skills differing from each other. For example, one robot may be equipped to implement a manipulation skill and another robot may be equipped to implement a navigation skill.

According to various specific embodiments, for each robot of the one or more robots, a labeled Markov decision process is determined for each skill (e.g., basic skill) which the robot is able to implement. Each labeled Markov decision process may be described by $\mathcal{M}=(S, A, p, \lambda)$, where S is the state space having a plurality of states $s \in S$, A is the action space having a plurality of actions $a \in A$, P are transition probabilities given by p: $S \times A \times S \rightarrow [0,1]$, and $\lambda$ is a labeling function. A transition probability may be described as $p(s'|s,a)$, where $p(s'|s,a)$ indicates the probability that action a in state S leads to state s'. According to various specific embodiments, labeling function $\lambda$ may indicate for one specific state of the plurality of states of state space $s \in S$, whether one or more control conditions $\mathcal{AP}$ of a plurality of predetermined control conditions is/are satisfied. According to various specific embodiment, labeling function $\lambda$ may map one specific state of the plurality of states of state space $s \in S$ onto one or more control conditions. A control condition as described herein may be represented as an atomic proposition. The labeling function may be described by $\lambda: S \rightarrow 2^{\mathcal{AP}}$. According to various specific embodiments, labeling function $\lambda$ may map each state of the plurality of states onto in each case one or more control conditions (e.g., atomic propositions). An atomic proposition (also called elementary proposition), as used herein, may be either "true" or "false." For example, according to the double-valuedness principle, each atomic proposition may have either the Boolean operator "true" or the Boolean operator "false." For instance, according to the double-valuedness principle, each atomic proposition of an LTL specification described herein may have either the Boolean operator "satisfying" or the Boolean operator "violating."

According to various specific embodiments, each labeled Markov decision process may be assigned a strategy $\pi$ which may be described by $\pi: S \times A \rightarrow [0, 1]$, so that $\pi(a|s)$ indicates the probability of the execution of action a in state s. For example, strategy $\pi$ may be determined in such a way that by execution of one or more actions, one or more goal states are achieved. The one or more goal states may form a goal area $S_g$ as subset of the state space, $S_g \subseteq S$. According to various specific embodiments, strategy $\pi$ may be determined in such a way that the one or more goal states are achieved by execution of one or more actions, in doing so, one or more safe states being avoided. The one or more safe (e.g., permissible) states may form a safe area $S_c$ as subset of the state space, $S_c \subseteq S$. A labeled Markov decision process and strategy $\pi$ assigned to the labeled Markov decision process may form an absorbing Markov chain, a set of absorbing states being able to be given by $S_g \cup \overline{S}_c$, where $\overline{S}_c = S \setminus S_c$. According to various specific embodiments, for an initial state distribution $\hat{S}$, an anticipated period of time $\mathbb{E}[d(\hat{s})]$ until an absorbing state is reached may be determined. For example, the anticipated period of time may be an execution time of the skill. According to various specific embodiments, the state distribution over the absorbing states after the execution, $\hat{S}'$, may be calculated and may be used to calculate the probability of achieving one of the one or more goal states, $p(S_g|\hat{s})$. For example, $p(S_g|\hat{s})$ may be a success rate of the skill. A failure rate of the skill may be described by probability $p(\overline{S}_c|\hat{s})$, for example.

According to various specific embodiments, a skill of a robot may feature one or more capabilities of the robot. For instance, a perception skill of a robot may include the capability to recognize an object and the capability to recognize a gesture of a user. A manipulation skill of a robot may include the capability to grip an object and the capability to move a gripped object, for example. According to various specific embodiments, each capability of a robot may be assigned to a skill.

In the following, the determination of the respective labeled Markov decision process is described for the following three exemplary basic skills:

I) a perception skill,
II) a navigation skill,
III) a manipulation skill.

It should be noted that in this case, three exemplary skills are involved, and that a labeled Markov decision process as described herein may be determined for each user-specific and/or application-specific skill of a robot.

I) Perception Skill

The perception skill may feature one or more perception capabilities such as, e.g., object detection, object tracking, detection of a human body pose, detection of a hand, hand tracking, detection of a gesture, etc. The detection and tracking of objects is necessary, for example, to recognize an environment and/or to identify objects.

According to various specific embodiments, the perception skill of a robot is determined (e.g., mapped) as labeled Markov decision process $\mathcal{M}$ with a state space S, an action space A and a labeling function $\lambda$.

Each state of the plurality of states of state space S may have one specific probability of one or more perceptions and/or one specific position of one or more objects. For example, an object may be a hand of a user. A perception may be a perception capability such as object detection, for instance, and the probability of the perception may be a probability of detecting the object. A perception may be a perception capability such as detection of a human body pose, for instance, and the probability of the perception may be a probability of detecting the body pose, given by body pose $\in [0, 1]$. For example, a perception may be a perception capability such as detecting a gesture, and the probability of the perception may have a specific probability of detecting a gesture, n, for each of one or more gestures, given by gesture $\in [0, 1]^n$. The specific position of one object, m, of the one or more objects may be described by object $\in \mathbb{R}^{3m}$. For instance, an object may be a hand, and the position of the hand may be regarded as separate from the object quantity, where the position of the hand may be described by Hand $\in \mathbb{R}^3$.

Each action of action space A may be assigned to an ascertainment of the specific probability of at least one perception of the one or more perceptions and/or to an ascertainment of the position of at least one object of the one or more objects. According to various specific embodiments, each action of the action space may be assigned to one perception capability of the one or more perception capabilities of the perception skill. For instance, an action may include the execution of an object detection, tracking of one or more objects, detecting a human body pose, detecting a hand, hand tracking, detecting a gesture, etc.

Labeling function $\lambda$ may indicate for one state of the plurality of states of the state space, whether one or more control conditions such as, e.g., one or more atomic propositions, which in each case are assigned to at least one perception of the one or more perceptions, is/are satisfied. A (e.g., predefined) probability threshold value may be assigned to each control condition. The respective control condition (e.g., the respective atomic proposition) is able to be satisfied, for example, if a probability of the at least one perception is greater than the assigned probability threshold value.

Labeling function $\lambda$ may indicate for one state of the plurality of states of the state space, whether one or more control conditions such as, e.g., one or more atomic propositions, which in each case are assigned to at least one object of the one or more objects, is/are satisfied. For example, the respective control condition (e.g., the respective atomic proposition) is able to be satisfied if the robot recognizes that the position of the at least one object is within a predefined distance from an assigned reference point. Illustratively, the reference point may be a hand of a user, and an atomic proposition determined with the aid of the labeling function may have Boolean value true if the position of the at least one object is within the predefined distance from the recognized hand.

Labeling function $\lambda$ may indicate for one state of the plurality of states of the state space, whether one or more common control conditions (e.g., one common atomic proposition), which in each case are assigned to at least one perception of the one or more perceptions and at least one object of the one or more objects, is/are satisfied. A respective common control condition is able to be satisfied, for example, if the probability of the at least one perception is greater than the assigned probability threshold value and if the position of the at least one object is within the predefined distance from the reference point.

According to various specific embodiments, labeling function $\lambda$ may indicate for one state of the plurality of states of the state space, whether a result of a perception capability is satisfied. For example, the perception capability may be detection of an object, the labeling function determining the control condition "object detected" as satisfied if the probability of the object detection is greater than the assigned probability threshold value. Illustratively, the perception capability may be detection of an object, the labeling function determining the Boolean operator true for the atomic proposition "object detected", for example, if the probability of the object detection is greater than the assigned probability threshold value. Illustratively, for example, labeling function $\lambda$ may determine a result of the perception skill as an atomic proposition for one state of the plurality of states of the state space. For example, one state may have detection of a gesture as perception, a position of a hand and a position of an object, and the labeling function may determine the Boolean operator true for the atomic proposition "pointing to object" if the probability of the detected gesture is greater than the assigned probability threshold value, and if the position of the object is within the predefined distance from the position of the hand.

Illustratively, a perception capability of the one or more perception capabilities of the perception skill may be implemented with the aid of an action, and the labeling function may output a result of the perception capability and/or of the perception skill as control condition (e.g., as atomic proposition).

According to various specific embodiments, labeled Markov decision process $\mathcal{M}$ may have unknown transition probabilities. The transition probabilities may be estimated, for example. According to various specific embodiments, a strategy $\pi$, assigned to labeled Markov decision process $\mathcal{M}$, may be ascertained concerning which action and therefore which perception capability should be implemented. For example, the strategy may be such that a computationally complicated perception capability of tracking a hand is only implemented if a body pose with a probability above an assigned threshold value is or was determined beforehand.

According to various specific embodiments, respective probabilities of the one or more perceptions and/or the respective positions of the one or more objects may be determined utilizing an RGB image and/or an RGB-D image as input. According to various specific embodiments, a 3D model may be determined for each object of the one or more objects. For example, an object may be recognized (e.g., detected) in an RGB image, by detecting local features and matching them to learned features, by determining a pose based on an ascertained agreement of the 3D model and the 2D-RGB image and utilizing an RANSAC algorithm, for example, and by determining depth information (e.g., utilizing the RGB-D image) in order to ascertain a quality metric of the resolution. For example, a neural network may be used to ascertain a body pose, utilizing the RGB-D image. For instance, a 2D-RGB image may be transformed into 3D information with the aid of depth information provided by a sensor, and a neural network may be set up to classify the 3D information in terms of a body pose. According to various specific embodiments, a static gesture may be ascertained by determining a Euclidean distance between a detected body pose (e.g., hand pose) and a predefined body pose for a plurality of consecutive frames, and a gesture may be determined by temporal filtering of the frames.

II) Navigation Skill

According to various specific embodiments, the navigation skill of a robot is determined (e.g., mapped) as labeled Markov decision process $\mathcal{M}$ with a state space S, an action space A and a labeling function $\lambda$.

Each state of the plurality of states of state space S may have one specific position of the robot. According to various specific embodiments, each state of the plurality of states of state space S may have one specific position and orientation of the robot. Each state of the plurality of states may have one specific position x, y and orientation e of the robot within a navigation area attainable by the robot with the aid of the navigation skill. According to various specific embodiments, the position assigned to one specific state may also have a z-coordinate. To illustrate, in the following a state space is described having x-coordinate and y-coordinate of the (e.g., planar) position as well as orientation $\theta$.

The navigation area within reach with the aid of the navigation skill may be given by an operating area $\mathcal{W}_{mp}$ of the robot. The navigation area within reach with the aid of the navigation skill may be given by an operating area $\mathcal{W}_{mp}$ of the robot and by obstacles $O$ located in operating area $\mathcal{W}_{mp}$, which limit the navigation area. The state space may be described by $S \subset \mathcal{W}_{mp} \backslash O$, each state of the state space being able to be described by $s=[x, y, \theta] \in S$.

Each action of action space A may feature a change in the position and or a change in the orientation of the robot. Illustratively, an action may be a movement of the robot and/or a rotation of the robot. For example, an action may be a velocity command.

According to various specific embodiments, the navigation area may have one or more goal areas and/or goal configurations. For example, a goal area may be given by a value range of position values x, y. A goal configuration may be given by a value range of orientations $\theta$ of the robot, for instance. The one or more goal areas and/or goal configurations may include a subset of the plurality of states and may be described by $S_g \subset S$.

According to various specific embodiments, for all states $s \in S_g$, labeling function $\lambda$ may determine a control condition (e.g., an atomic proposition), which characterizes states $s \in S_g$ as goal states. For example, labeling function $\lambda$ may determine the atomic proposition goal state=true for all states $s \in S_g$. According to various specific embodiments, labeling function may indicate for one state whether one or more control conditions, which in each case are assigned to one spatial area, is/are satisfied. For example, the respective control condition is able to be satisfied if the position of the robot is within the spatial area. Illustratively, for instance, a control condition may be an atomic proposition of one specific spatial area and may have the Boolean value true if the position of the robot is within the spatial area. As an illustrative example, the navigation area of the robot may have a first station with assigned first states and a second station with assigned second states. In this case, labeling function $\lambda$ may determine for one state the atomic proposition Station1 and the atomic proposition Station2, the atomic proposition Station1 having the Boolean value true if the state is one of the first states, and the atomic proposition Station2 having the Boolean value true if the state is one of the second states.

According to various specific embodiments, the navigation skill may be or is implemented utilizing the move_base package of the ROS navigation stack. The move_base package connects a global planner and a local planner. For example, a method based on harmonic potential fields may be used as global planner. This may lead to reduced computational requirements, for instance, and is able to handle large and complex operating areas. In addition, it ensures collision-free navigation. According to various specific embodiments, a transformation $T_m$ may be used, which i) maps the operating area of robot $\mathcal{W}_{mp}$ onto a punctured Euclidean plane, ii) maps an outer edge $C_0$ of the operating area onto an infinity, iii) maps the respective edges of all obstacles $C_1, C_2, \ldots, C_{N_{obs}^{mp}}$ in the operating area onto $q_{mp,0}^i$, $\forall i \in (1, 2, \ldots, N_{obs}^{mp})$, and iv) maps goal positions $p_{mp}^d$ onto individual points $q_{mp}^d$ of the punctured Euclidean plane. Consequently, a path is able to be determined from a present position to a goal position. For example, a timed elastic band approach may be used as local planner. In this context, a path determined by the global planner may be optimized in terms of reducing (e.g., minimizing) a trajectory execution time, avoidance of obstacles and/or agreement with kinodynamic conditions. In addition, the approach is in accord with non-holonomic conditions, by solving a sparse, scaled multi-object optimization problem. For example, if $p_{mp,k}=[x_k, y_k, \theta_k]^T$ is a robot pose at a discreet point at time k, then a discreet trajectory may be described by $\mathcal{T} = \{p_{mp,k} | k=1, 2, \ldots, n\}$. In this case, the timed elastic band approach is able to adjust the trajectory with time intervals of $\tau = \{\Delta T_k \in \mathbb{R}_+ | k=1, 2, \ldots, n-1\}$, where $\Delta T_k > 0$ indicates the time necessary to reach $p_{mp,k+1}$ from $p_{mp,k}$. The adjusted trajectory may be described by $B:=(\mathcal{T}, \tau)$. For example, the optimization problem may be the determination of the velocity commands, and may be formulated according to:

$$\min_B \sum_{k=1}^{n-1} \Delta T_k^2, \qquad (1)$$

where one or more of the following conditions may be given:

$$p_{mp,1} = p_{mp,c}, \quad p_{mp,n} = p_{mp,f}, \quad 0 \geq \Delta T_k \leq \Delta T_{max}$$

$$h(p_{mp,k}, p_{mp,k+1}) = 0$$

$$o_k(p_{mp,k}) \geq 0$$

$$v_k(p_{mp,k}, p_{mp,k+1}, \Delta T_k) \geq 0$$

with $h(p_{mp,k}, p_{mp,k+1})$ being the kinematic condition, $o_k(p_{mp,k})$ being the condition of the object avoidance, and $v_k(p_{mp,k}, p_{mp,k+1}, \Delta T_k)$ being the condition with respect to the maximum velocity.

According to various specific embodiments, strategy $\pi$ assigned to labeled Markov decision process $\mathcal{M}$ may be determined with the aid of the global planner and optionally, with the aid of the local planner, as well. According to various specific embodiments, the strategy determined for implementing the navigation skill may furthermore be evaluated during the mission planning.

Under the assumption that $\mathcal{W}_{mp} \backslash O$ represents a state space (e.g., that all states of the navigation area are connected topologically), the probability that the robot in a current state $p_{mp} \in S$ is in the goal state $p_{mp}{}^d \in S_g$ is equal to "1", i.e., $\pi(p_{mp}{}^d | p_{mp}) = 1$. According to various specific embodiments, the transition probabilities may be ascertained with the aid of a forward simulation and/or with the aid of the results determined by the global planner (and optionally, the local planner, as well). The anticipated period of time $\mathbb{E}(d(\hat{s})) \in \mathbb{R}$ with $\hat{s} \in S_g$ may be determined during operation of the robot for a provided mission specification, utilizing the current state (e.g., the current configuration) $p_{mp}(t) \in S$.

III) Manipulation Skill

According to various specific embodiments, the manipulation skill of a robot is determined (e.g., mapped) as labeled Markov decision process $\mathcal{M}$ with a state space S, an action space A and a labeling function $\lambda$.

According to various specific embodiments, the robot is able to manipulate a predefined manipulation space with the aid of the manipulation skill. Illustratively, the robot may be a robot arm having an end effector, such as first robot 100, for example, and the area which is able to be manipulated with the aid of the end effector may form the predefined manipulation space. According to various specific embodiments, the robot is able to manipulate the predefined manipulation space with the aid of the manipulation skill, utilizing one or more manipulation capabilities. For example, a manipulation capability may be a mechanical movement of the robot (e.g., the robot arm) and/or a capability of the end effector of the robot such as gripping, releasing, placing, etc.

According to various specific embodiments, a movement of the robot between two positions may be determined utilizing dynamic modeling and an abstraction-based control design. This has the effect, for example, of ensuring safety during the movement. For instance, a collision-free path between two positions may be determined with the aid of the RRT-Connect algorithm implemented in the Moveit-Toolbox. With regard to the dynamic modeling, a discrete time model of the dynamics of the robot (e.g., the robot arm) may be constructed according to:

$$x^+ \in Ax + Bu + c \oplus W, \quad (2)$$

where the state is $x \in X$, the input is $u \in U$ and the disturbance variable is W. For instance, the discrete time model may be determined by determining (e.g., sampling) data points made up of a command and a position in conjunction with predefined trajectories. According to various specific embodiments, the predefined manipulation space may be divided into a plurality of manipulation areas. For example, the predefined manipulation space may be split into a plurality of manipulation areas utilizing hyperplanes. According to various specific embodiments, the dynamics may be determined in each manipulation area of the plurality of manipulation areas. For instance, the dynamics in each manipulation area of the plurality of manipulation areas may be determined utilizing an affine function. According to various specific embodiments, the dividing of the predefined manipulation space into the plurality of manipulation areas may be or is implemented as an optimization problem that may be formulated as a mixed-integer linear program, for example. The abstraction-based control design may be implemented utilizing a reference trajectory in accordance with the abstraction-based control design described in reference [2]. In this connection, for an initial state (in some aspects also referred to as original state) $X_0 \in X_0 \subseteq X$ a limited area $S_0 \subset X_0$ may be ascertained (e.g., selected), so that $x_0 \in S_0$. $S_0$ may thereby be set as initially selected area. The overlap between initial area $S_0$ and the reference trajectory may be determined as local description. Utilizing initial area $S_0$, a local symbolic generalization may be ascertained by approximating the states and input $u \in U$. Utilizing the local symbolic generalization, an algorithm (e.g., a common fixed-point algorithm) may be used to ascertain the control variables, so that the robot (e.g., the end effector of the robot) moves to the local description. As soon as the local description is fulfilled, a next limited area may be determined and the local symbolic generalization may subsequently be ascertained for the next limited area. By iteration of this method, a global control strategy may be determined.

Each state of the plurality of states of state space S may be assigned to one manipulation area of the plurality of manipulation areas. Illustratively, the manipulation space may be or is divided into a plurality of cells, where each cell may be a limited area (see, e.g., the paragraph above), and each cell may be assigned to one state. Each state of the plurality of states may describe one configuration of the robot in one manipulation area. For given robot-specific assumptions about errors of the model and disturbance variables, the control algorithm is able to ensure that the probability that a state to be achieved is achieved is equal to "1". According to various specific embodiments, each state of the plurality of states of state space S may have one configuration of the robot. For example, the configuration may have one or more configuration positions of the robot. For instance, a configuration position may be a position of one or more final controlling elements of the robot. The configuration may have an end-effector configuration of the robot, for example.

Each action of action space A may be assigned to at least one manipulation capability such as a mechanical movement of the end effector and/or a capability of the end effector.

Labeling function $\lambda$ may indicate for one state of the plurality of states, whether one or more control conditions, which are assigned to one configuration of the robot, is/are satisfied. For example, for each state of the plurality of states, labeling function $\lambda$ may determine one specific configuration of the robot as one or more atomic propositions.

According to various specific embodiments, each control condition of the one or more control conditions may be assigned to one specific configuration position of the one or more configuration positions. Labeling function λ may indicate for one state, whether the control conditions which are assigned to the configuration positions are satisfied. Each configuration position of the one or more configuration positions may be assigned one or more manipulation areas of the plurality of manipulation areas. According to various specific embodiments, the control condition assigned to one specific configuration position is able to be satisfied (e.g., an atomic proposition may have the Boolean value true), if the manipulation area assigned to the state corresponds to one of the one or more manipulation areas of the configuration position.

As an illustrative example, a configuration position may be a basic position, for instance, and in this example, several manipulation areas (illustratively, e.g., several cells) may be assigned to the basic position. In this case, for one state, for example, labeling function λ may determine the atomic proposition basic position, the atomic proposition having the Boolean value true if the manipulation area assigned to the state corresponds to one of the several manipulation areas of the basic position (basic position=true), and the atomic proposition having the Boolean value false if the manipulation area assigned to the state corresponds to none of the several manipulation areas of the basic position (basic position=false).

According to various specific embodiments, for each robot, all control conditions (e.g., all atomic propositions of the plurality of atomic propositions) which the respective labeling function maps for a state may be satisfied (e.g., may have the Boolean value true). Thus, for example, the labeling function may map only atomic propositions which have the Boolean operator true. With respect to the example of the atomic proposition basic position, the atomic proposition may have the Boolean value true if the manipulation area assigned to the state corresponds to one of the several manipulation areas of the basic position (basic position=true), and if the manipulation area assigned to the state corresponds to none of the several manipulation areas of the basic position, the labeling function may be set up to map no atomic proposition.

According to various specific embodiments, each configuration of the robot may have one specific end-effector configuration of a plurality of end-effector configurations. For example, an end-effector configuration may be a gripper configuration or a loosen configuration. According to various specific embodiments, labeling function λ may indicate for one state whether one control condition, which is assigned to one specific end-effector configuration of the plurality of end-effector configurations of the robot, is satisfied. The control condition is able to be satisfied, for example, if the configuration of the robot has the end-effector configuration. Illustratively, each control condition may have one atomic proposition, and the atomic proposition assigned to one specific end-effector configuration may have the Boolean value true if the configuration of the robot has the end-effector configuration.

As an illustrative example, the plurality of end-effector configurations may have a gripper configuration and a loosen configuration. For example, labeling function λ may determine the atomic proposition gripper configuration for one state, the atomic proposition having the Boolean value true if the end-effector configuration assigned to the state corresponds to the gripper configuration (gripper configuration=true), and the atomic proposition having the Boolean value false if the end-effector configuration assigned to the state does not correspond to the gripper configuration (gripper configuration=false). For instance, labeling function λ may determine the atomic proposition loosen configuration for one state, the atomic proposition having the Boolean value true if the end-effector configuration assigned to the state corresponds to the loosen configuration (loosen configuration=true), and the atomic proposition having the Boolean value false if the end-effector configuration assigned to the state does not correspond to the loosen configuration (loosen configuration=false).

According to various specific embodiments, the anticipated period of time (e.g., the execution time) like, for example, of the movement from a first position to a second position may be proportional to the number of manipulation areas, which illustratively in the example, are traversed from the first position to the second position.

According to various specific embodiments, a mission defined by a mission specification may be provided. The mission specification may have a time sequence over a subset of the plurality of control conditions (e.g., at least two control conditions, e.g., more than two control conditions, e.g., a multitude of control conditions). According to various specific embodiments, the one or more robots (e.g., a single robot) may be controlled to execute the mission, utilizing the respective control conditions and the subset of the plurality of control conditions of the mission specification. According to various specific embodiments, the one or more robots may include a variety of robots, and the variety of robots may be controlled (e.g., with the aid of the central control device) for the cooperative execution of the mission, utilizing the respective control conditions of each robot of the variety of robots and the subset of the plurality of control conditions of the mission specification.

According to various specific embodiments, for each robot, all control conditions of the plurality of control conditions which the respective labeling function does not map for a state cannot be satisfied (e.g., the atomic proposition may have the Boolean value false). According to various specific embodiments, for each robot, all control conditions of the plurality of control conditions which the respective labeling function maps for a state are able to be satisfied (e.g., the atomic proposition may have the Boolean value true). Thus, for example, according to various specific embodiments, the labeling function may map only control conditions which are satisfied (i.e., which have the Boolean operator true).

With respect to exemplary robot system 10, first robot 100 may have a manipulation skill, second robot 200 may have a navigation skill and/or third robot 300 have a perception skill. For example, memory 111 of first robot 100 may have a labeled Markov decision process for the manipulations skill. For example, memory 211 of second robot 200 may have a labeled Markov decision process for the navigation skill. For example, memory 311 of third robot 300 may have a labeled Markov decision process for the perception skill. According to various specific embodiments, utilizing the respective Markov decision processes (e.g., the labeling function of the respective Markov decision processes), first robot 100, second robot 200 and third robot 300 may be controlled to cooperatively execute one common mission, which is given by a mission specification with a time sequence over a subset of the plurality of control conditions.

Figure 2:
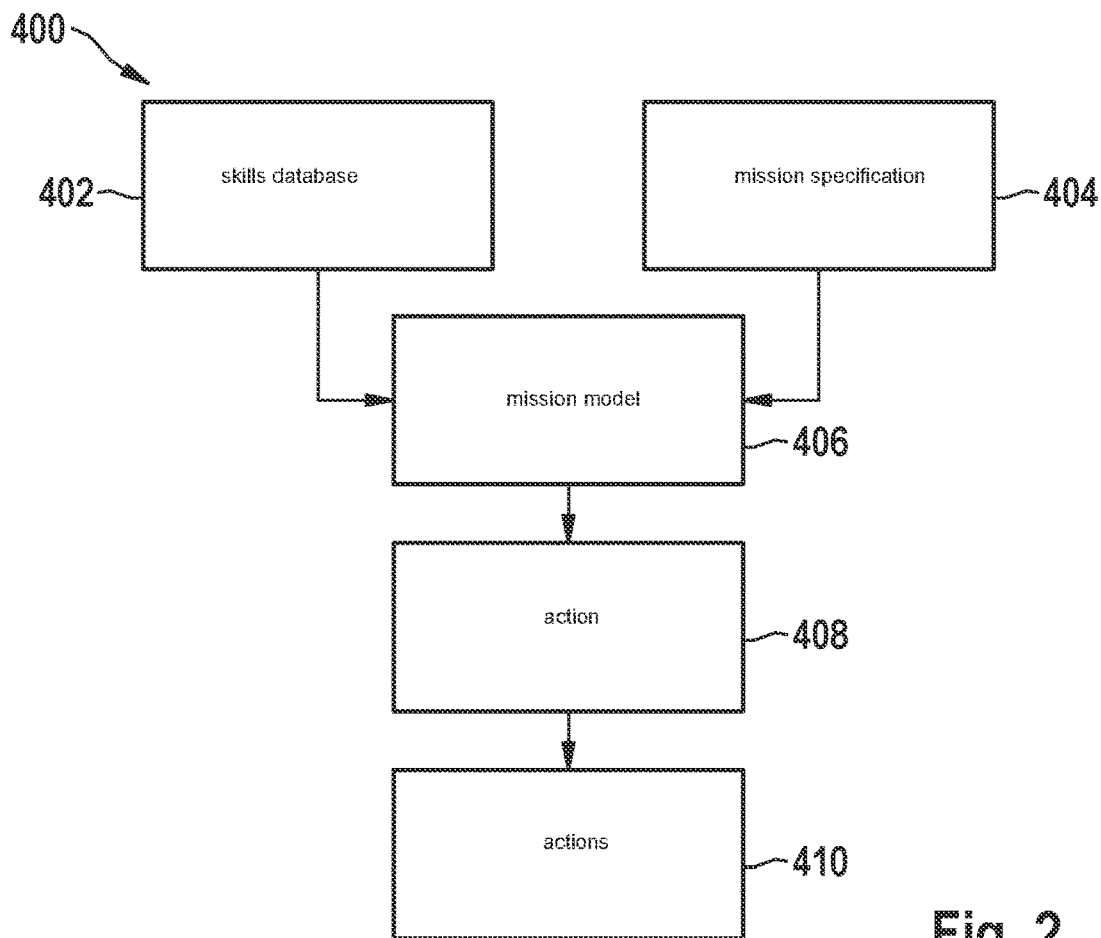
FIG. 2 shows a flowchart for the execution of a mission by one or more robots according to various specific embodiments of the present invention.

FIG. 2 shows a flowchart 400 for the execution of a mission by one or more robots according to various specific embodiments. For example, the one or more robots may be a variety of robots, and according to various specific embodiments, flowchart 400 may be a flowchart for the cooperative execution of the mission by the variety of robots.

A skills database 402 may have the respective labeled Markov decision processes for each skill of each robot of the one or more robots. For instance, a robot may have a manipulation skill and a perception skill, and skills database 402 may have the labeled Markov decision process of the manipulation skill and the labeled Markov decision process of the perception skill of the robot. For example, each one of the labeled Markov decision processes for the skills of one specific robot may be stored in the memory of the specific robot, and the entirety of the labeled Markov decision processes may form skills database 402. Illustratively, decentrally-stored labeled Markov decision processes of the respective skills of each of the one or more robots may be part of skills database 402. The labeled Markov decision processes may be defined as described herein by a robot engineer and/or developer, for example.

According to various specific embodiments, a mission specification 404 may be provided. Mission specification 404 may have a time sequence over a subset of the plurality of predetermined control conditions. For example, mission specification 404 may be formulated with the aid of Linear Temporal Logic (LTL). An LTL specification $\phi$ as mission specification 404 may be regarded as classifying time sequences $\sigma: N \rightarrow 2^{\mathcal{AP}}$ over control conditions $\mathcal{AP}$, such as atomic propositions $\mathcal{AP}$, for example, where atomic propositions $\mathcal{AP}$ may be characterized either as satisfying (e.g., fulfilling the mission) or as violating (e.g., not fulfilling the mission). According to various specific embodiments, a computer may be equipped to generate LTL specification $\phi$ as mission specification 404 in reaction to a user input, utilizing a pattern catalog such as the Patterns based Mission specifier (PsALM), for example. This has the effect that mission specification 404 is able to be generated in user-friendly fashion (e.g., no specialized knowledge required). For example, the user selects a mission-specific pattern such as a goal of a goods delivery, for instance, and the computer is able to generate mission specification 404 for the mission-specific pattern. The LTL specification is described in detail in reference [1].

According to various specific embodiments, a mission model 406 may be generated utilizing skills database 402 and mission specification 404. Illustratively, mission model 406 may use atomic propositions $\mathcal{AP}$, which the respective labeling function is able to determine for each state of the labeled Markov decision process of each skill, and atomic propositions $\mathcal{AP}$, which mission specification 404 has, as interface. This permits cooperation between heterogeneous robots. According to various specific embodiments, mission model 406 may be a mission model distributed among the robots of the one or more robots, each robot being able to map a subset of mission model 406 (e.g., being able to carry out a portion of the calculations). For example, this has the effect that to the greatest extent possible, the robots are able to be operated independently of each other during operation, while nevertheless being able to accomplish the mission cooperatively. To that end, information may be exchanged between the robots for the purpose of assigning the tasks.

For example, each robot of the one or more robots may determine which actions (e.g., capabilities) it is able to implement in order to achieve the goal defined by mission specification 404.

According to various specific embodiments, the robots may determine in auction rounds, which robot next will perform which action. In this way, for example, an action 408 to be performed may be determined for each robot of the one or more robots. For instance, several robots may have a perception skill, and the robot for which the implementation of a perception capability, necessary for execution of the mission, has the lowest anticipated costs may determine the perception capability as action 408 to be carried out. According to various specific embodiments, the anticipated costs may be determined utilizing the period of time anticipated for implementing a capability. According to various specific embodiments, the one or more robots may perform the actions 410. According to various specific embodiments, the one or more robots may be a variety of robots, and the variety of robots may carry out the actions cooperatively. Illustratively, a mission may thus be distributed dynamically over the robots of the variety of robots, actions may be assigned to the robots of the variety of robots, and the respective actions may be performed by the robots. A detailed method for executing a mission defined with the aid of an LTL specification utilizing atomic propositions is described in reference [1].

Illustratively, skills of the robots may thus be implemented independently of a mission, and mission-specific patterns of a mission may be parameterized independently of the implementation of the skills of the robots.

According to various specific embodiments, a mission execution may be implemented in the form of several layers. In this context, a first layer of the several layers may be a mission layer, which is able to facilitate a portioning of the mission, a planning and/or a communication during the auction rounds (see, e.g., reference [1]). The second layer of the several layers following the first layer may be a strategy layer which monitors a strategy to be carried out. The third layer of the several layers following the second layer may be a skills layer which may have the implementation, described herein, of the skills as respective labeled Markov decision processes. The fourth layer of the several layers following the third layer may have the individual components which are used during the implementation of a specific skill.

Figure 3:
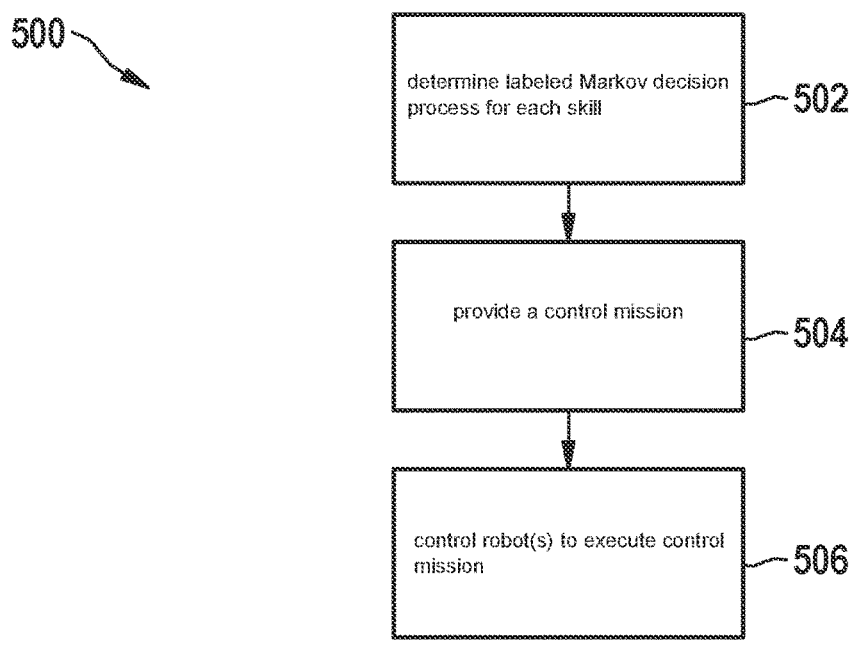
FIG. 3 shows a method for controlling one or more robots according to various specific embodiments of the present invention.

FIG. 3 shows a method 500 for controlling one or more robots according to various specific embodiments.

For each robot of the one or more robots, method 500 may include determination of a labeled Markov decision process for each skill of one or more skills which the robot is able to implement (in 502). Each labeled Markov decision process may have a labeling function which indicates for each state of the labeled Markov decision process, whether one or more control conditions of a plurality of predetermined control conditions is/are satisfied.

Method 500 may include providing a control mission defined by a mission specification (in 504). The mission specification may have a time sequence over a subset of the plurality of predetermined control conditions.

Method 500 may include controlling the one or more robots to execute the control mission in such a way that the control conditions of states of the one or more robots contained in the mission specification are satisfied (in 506).

What is claimed is:

1. A method for controlling one or more robots, comprising the following steps:

determining, for each robot of the one or more robots, a labeled Markov decision process for each skill of one or more skills which the robot is able to implement, each labeled Markov decision process having a labeling function which indicates for each state of a plurality of states of the labeled Markov decision process, whether one or more control conditions of a plurality of predetermined control conditions is able to be satisfied;

providing a control mission defined by a mission specification, the mission specification having a time sequence over a subset of the plurality of predetermined control conditions; and controlling the one or more robots to execute the control mission in such a way that the control conditions of states of the one or more robots contained in the mission specification are satisfied, wherein:

each of the plurality of control conditions is represented by a respective atomic proposition, and the labeling function maps the states only to atomic propositions corresponding to conditions that can be satisfied.

2. The method as recited in claim 1, wherein at least one skill of the one or more skills of at least one robot of the one or more robots is a perception skill, and wherein the determination of the labeled Markov decision process for the perception skill of the at least one robot includes:

determining a state space having a plurality of states, each state of the plurality of states having a specific probability of one or more perceptions and/or one specific position of one or more objects;

determining each action of an action space of the labeled Markov decision process, each action being assigned to an ascertainment of the specific probability of at least one perception of the one or more perceptions and/or to an ascertainment of the position of at least one object of the one or more objects; and determining the labeling function of the labeled Markov decision process, the labeling function indicating for each state:

whether one or more respective control conditions, which are assigned to at least one perception of the one or more perceptions, is satisfied, a probability threshold value being assigned to each at least one perception, and the respective control condition being satisfied when a probability of the at least one perception is greater than the assigned probability threshold value; and/or whether one or more respective control conditions, which are assigned to at least one object of the one or more objects, is satisfied, the respective control condition being satisfied when the robot recognizes that the position of the at least one object is within a predefined distance from an assigned reference point; and/or whether one or more respective common control conditions, which are assigned to at least one perception of the one or more perceptions and at least one object of the one or more objects, is satisfied, the respective common control condition being satisfied when the probability of the at least one perception is greater than the assigned probability threshold value and when the robot recognizes that the position of the at least one object is within the predefined distance from the reference point.

3. The method as recited in claim 2, wherein:

one perception of the one or more perceptions is an object detection, and the probability of the perception is the probability of the detection of the object; and/or one perception of the one or more perceptions is detection of a human body pose, and the probability of the perception is the probability of the detection of the body pose; and/or one perception of the one or more perceptions is detection of a gesture, and the probability of the perception has a specific probability of the detection of a gesture for each of one or more gestures.

4. The method as recited in claim 1, wherein at least one skill of the one or more skills of at least one robot of the one or more robots is a navigation skill, and wherein the determination of the labeled Markov decision process for the navigation skill of the at least one robot includes:

determining a state space having a plurality of states, each state of the plurality of states having one specific position and orientation of the robot;

determining each action of an action space of the labeled Markov decision process, each action featuring a change in the position and/or a change in the orientation of the robot; and determining the labeling function of the labeled Markov decision process, the labeling function indicating for one state whether one or more respective control conditions, which in each case are assigned to one spatial area, is satisfied, the respective control condition being satisfied when the position of the robot is within the spatial area.

5. The method as recited in claim 4, wherein each state of the plurality of states has one specific position and orientation of the robot within a navigation area attainable by the robot using the navigation skill.

6. The method as recited in claim 1, wherein at least one skill of the one or more skills of at least one robot of the one or more robots is a manipulation skill, the at least one robot being able to manipulate a predefined manipulation space using the manipulation skill, utilizing one or more manipulation capabilities, and the determination of the labeled Markov decision process for the manipulation skill of the robot includes:

dividing the predefined manipulation space into a plurality of manipulation areas;

determining a state space having a plurality of states, each state of the plurality of states being assigned to one manipulation area of the plurality of manipulation areas;

determining each action of an action space of the labeled Markov decision process, each action being assigned to at least one manipulation capability; and determining the labeling function of the labeled Markov decision process, the labeling function indicating for one state whether one or more control conditions, which are assigned to one configuration of the robot, is satisfied.

7. The method as recited in claim 6, wherein:

each configuration of the robot has one or more configuration positions;

each control condition of the one or more control conditions is assigned to one specific configuration position of the one or more configuration positions;

one or more manipulation areas of the plurality of manipulation areas is assigned to each configuration position of the one or more configuration positions; and the control condition assigned to one specific configuration position is satisfied when the manipulation area assigned to the state corresponds to one of the one or more manipulation areas of the configuration position.

8. The method as recited in claim 6, wherein:

each configuration of the robot has one specific end-effector configuration of a plurality of end-effector configurations;

each control condition of the one or more control conditions is assigned to one end-effector configuration of the plurality of end-effector configurations; and the control condition assigned to one specific end-effector configuration is satisfied when the configuration of the robot has the end-effector configuration.

9. The method as recited in claim 8, wherein the plurality of end-effector configurations includes a gripper configuration and/or a loosen configuration.

10. The method as recited in claim 1, wherein each control condition of the plurality of predetermined control conditions for which the labeling function does not indicate for a state whether the control condition is satisfied, is not satisfied.

11. A robot system, comprising:
one or more robots;
wherein the robot system is configured to control the one or more robots, the robot system configured to:
 determine, for each robot of the one or more robots, a labeled Markov decision process for each skill of one or more skills which the robot is able to implement, each labeled Markov decision process having a labeling function which indicates for each state of a plurality of states of the labeled Markov decision process, whether one or more control conditions of a plurality of predetermined control conditions is able to be satisfied;
 provide a control mission defined by a mission specification, the mission specification having a time sequence over a subset of the plurality of predetermined control conditions; and
 control the one or more robots to execute the control mission in such a way that the control conditions of states of the one or more robots contained in the mission specification are satisfied, wherein:
 each of the plurality of control conditions is represented by a respective atomic proposition, and
 the labeling function maps the states only to atomic propositions corresponding to conditions that can be satisfied.

12. A device configured to control one or more robots, the device configured to:
 determine, for each robot of the one or more robots, a labeled Markov decision process for each skill of one or more skills which the robot is able to implement, each labeled Markov decision process having a labeling function which indicates for each state of a plurality of states of the labeled Markov decision process, whether one or more control conditions of a plurality of predetermined control conditions is able to be satisfied;
 provide a control mission defined by a mission specification, the mission specification having a time sequence over a subset of the plurality of predetermined control conditions; and
 control the one or more robots to execute the control mission in such a way that the control conditions of states of the one or more robots contained in the mission specification are satisfied, wherein:
 each of the plurality of control conditions is represented by a respective atomic proposition, and
 the labeling function maps the states only to atomic propositions corresponding to conditions that can be satisfied.

13. A non-volatile storage medium on which is stored a computer program including program instructions for controlling one or more robots, the program instructions, when executed by a computer, causing the computer to perform the following steps:
 determining, for each robot of the one or more robots, a labeled Markov decision process for each skill of one or more skills which the robot is able to implement, each labeled Markov decision process having a labeling function which indicates for each state of a plurality of states of the labeled Markov decision process, whether one or more control conditions of a plurality of predetermined control conditions is able to be satisfied;
 providing a control mission defined by a mission specification, the mission specification having a time sequence over a subset of the plurality of predetermined control conditions; and
 controlling the one or more robots to execute the control mission in such a way that the control conditions of states of the one or more robots contained in the mission specification are satisfied, wherein:
 each of the plurality of control conditions is represented by a respective atomic proposition, and
 the labeling function maps the states only to atomic propositions corresponding to conditions that can be satisfied.

\* \* \* \* \*